US008663017B1

(12) United States Patent
Smyth

(10) Patent No.: US 8,663,017 B1
(45) Date of Patent: Mar. 4, 2014

(54) MATRIX JUDGING SYSTEMS AND METHODS

(71) Applicant: James M. Smyth, New Buffalo, MI (US)

(72) Inventor: James M. Smyth, New Buffalo, MI (US)

(73) Assignee: International Awards Group, LLC, New Buffalo, MI (US)

( * ) Notice: Subject to any disclaimer, the term of this patent is extended or adjusted under 35 U.S.C. 154(b) by 0 days.

(21) Appl. No.: 13/836,384

(22) Filed: Mar. 15, 2013

(51) Int. Cl.
*A63F 13/12* (2006.01)

(52) U.S. Cl.
USPC .................... 463/42; 463/40; 700/91; 700/92

(58) Field of Classification Search
USPC .................... 700/91, 92; 463/40-42; 434/306
See application file for complete search history.

(56) References Cited

U.S. PATENT DOCUMENTS

| | | | | |
|---|---|---|---|---|
| 6,968,243 | B1 * | 11/2005 | Oh | 700/91 |
| 2006/0052886 | A1 * | 3/2006 | Lydon et al. | 700/91 |
| 2007/0027562 | A1 * | 2/2007 | de Voghelaere Parr | 700/91 |
| 2007/0118239 | A1 * | 5/2007 | Zimmermann et al. | 700/92 |
| 2007/0244585 | A1 * | 10/2007 | Speiser et al. | 700/91 |
| 2008/0172137 | A1 * | 7/2008 | Safina | 700/91 |
| 2008/0248873 | A1 * | 10/2008 | Lang | 463/40 |
| 2009/0286609 | A1 * | 11/2009 | Dyrdek | 472/89 |
| 2010/0121650 | A1 * | 5/2010 | Hughes et al. | 705/1.1 |
| 2011/0300916 | A1 * | 12/2011 | Patchen | 463/1 |

OTHER PUBLICATIONS

Britannica Online Encyclopedia via WayBack Machine, Fibonacci numbers, http://web.archive.org/web/20110421062725/http://www.britannica.com/EBchecked/topic/205791/Fibonacci-numbers, Apr. 21, 2011.*

* cited by examiner

*Primary Examiner* — Damon Pierce
(74) *Attorney, Agent, or Firm* — Foley & Lardner LLP

(57) ABSTRACT

A method for conducting matrix judging of a competition. The method includes receiving competition information for a competition. Calculating a rating value for each of the two or more rating adjectives, receiving one or more entries which are submitted into the competition associated with the received competition information. Conducting at least one round of judging. Each round of judging comprises sending, to one or more judging terminals, round information. Receiving from each of the one or more judging terminals, voting information. Calculating a criteria score for each of the one or more evaluation criteria for each entry. Calculating a round score for each entry. Ranking entries in the round. Removing losing entries and sending score data for each of the losing entries to a respective contestant. Determining whether the round is the last round and, if the round is the last round of judging, sending score data to each respective contestant for each of the one or more remaining entries.

20 Claims, 5 Drawing Sheets

Fig. 2B
200
iPad
9:15 AM
29%
Instructions Page
Sync session - Gideon Amichay (gamichay)
Refresh
NEW YORK FESTIVALS
Alex Test! Round 3
204
Title: Yacht
Competition: COMMERCIALS (MOBILE / ONLINE / RADIO / TV & CINEMA): Products & Services
Category: Media Promotion - TV & Cinema
Brand/sponsor: HBO
Add a comment:
220
218
Vote
Concept / Idea
Brand & Market Relevance
Production / Execution
SUBMIT
Abstain

MATRIX JUDGING SYSTEMS AND METHODS

BACKGROUND

The present application relates to judging and evaluating systems. More particularly, systems, methods, apparatuses and computer-readable medium for a matrix judging system are described.

Professional judging and award competitions are commonly used to recognize best-of-industry entries. Many professional companies and individuals submit content to award competitions, where a plurality of judges decide on which entries are the best. The winning entries and contestant are recognized by the organization for the excellence of their work. Contestants seek the recognition of winning competitions because the recognition of winning helps drive the entrant's stature which can lead to gaining additional work. For example, an advertising agency that is prominently recognized for recent work may benefit by gaining new clients for the advertising agency's services.

Although it is often understandable why the winning contestant or entry was chosen, the ranking or rating of individual entries that were not given an award is less clear because the data was never known and/or made available to the entrants.

SUMMARY

One embodiment relates to a system and method for conducting matrix judging of a competition. The method includes receiving competition information for a competition. The competition information comprises one or more evaluation criteria, two or more rating adjectives, and information for one or more rounds of the competition. Only one round of the one or more rounds can be open for judging at a time. Calculating a rating value for each of the two or more rating adjectives, receiving one or more entries which are submitted into the competition associated with the received competition information. Each of the entries is associated with a contestant. Conducting at least one round of judging. Each round of judging comprises sending, to one or more judging terminals, round information. The round information comprises the one or more evaluation criteria, each entry in the round, and at least two of the two or more rating adjectives. The round of judging further comprises receiving from each of the one or more judging terminals, voting information. The voting information comprises a rating adjective selection for each of the one or more evaluation criteria for each of the entries in the round. The round of judging further comprises calculating a criteria score for each of the one or more evaluation criteria for each entry, wherein the criteria score is based on the rating value associated with the rating selections received from the one or more judging terminals. Calculating a round score for each entry, where the round score is calculated based on the criteria score for each of the one or more evaluation criteria and the round score is associated with the round. Ranking entries in the round, where the rank is determined based on the round score for each of the one or more entries in the round. Removing losing entries, where the losing entries are based on the round score of the one or more entries in the round. Sending score data for each of the losing entries to a respective contestant. Determining whether the round is the last round and, if the round is the last round of judging, sending score data to each respective contestant for each of the one or more remaining entries.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION

Figure 1:
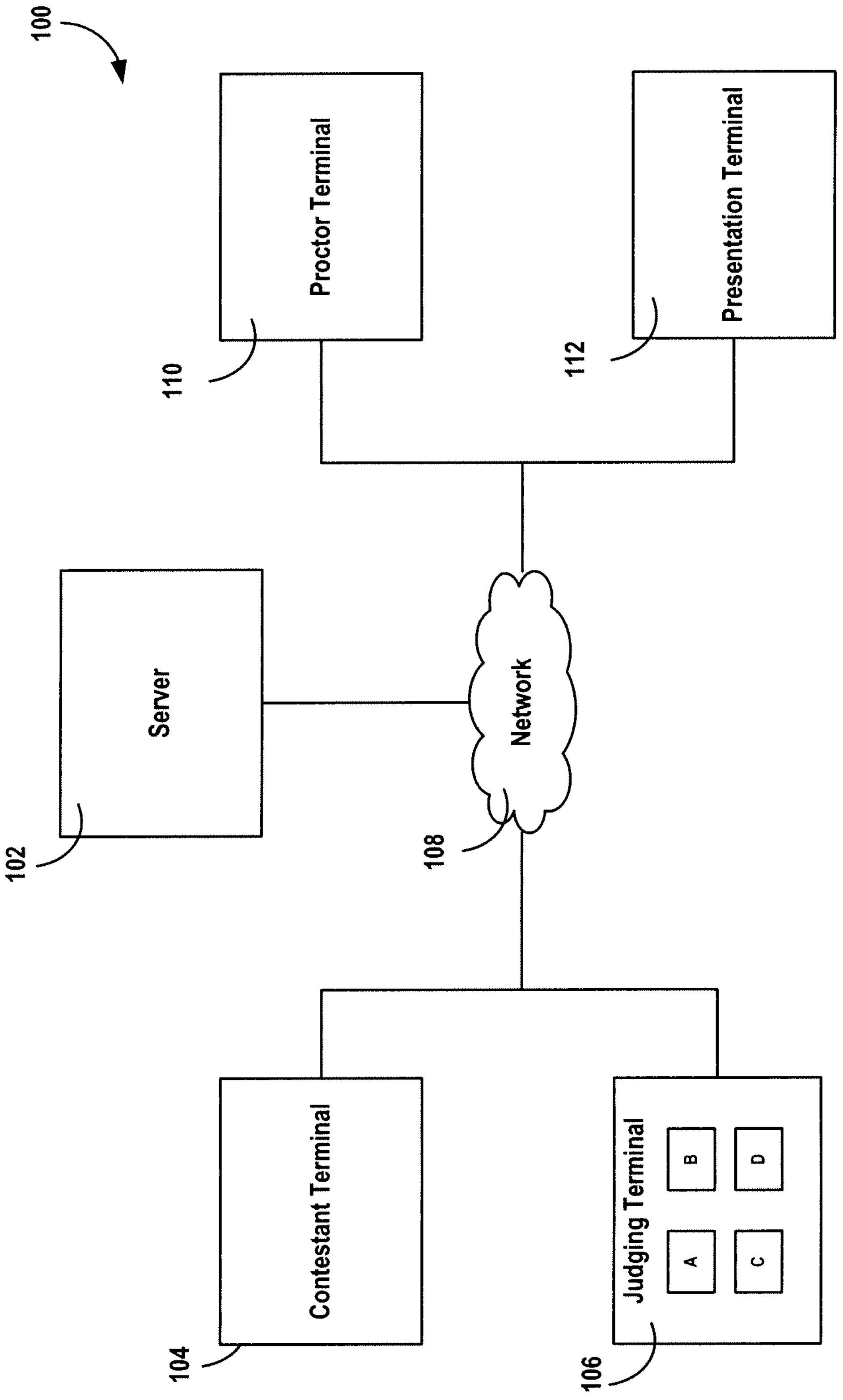
FIG. 1 depicts a matrix judging system in accordance with an illustrative implementation.

Described herein are techniques for a matrix judging system. In one implementation, a matrix judging system allows for the creation of an awards competition, submission of entries into the awards competition, the collection of judge's scores via judging terminals, receiving rating selections from judges via judging terminals, and sending score data to contestant terminals.

In one implementation, the matrix judging system can be setup to include multiple award competitions. A competition can be related to any group. For example, an awards competition can be focused on radio programs, television programs, feature films, advertising campaigns, etc. Each award competition can be configured with one or more categories for entries, one or more evaluation criteria, two or more rating adjectives for each evaluation criteria, and numeric values associated with each rating adjective.

The matrix judging system can receive requests to create award competitions. For example, the matrix judging system can receive entries and associated information from entrants or from third parties submitting an entry. Competition information, evaluation criteria, rating adjectives, rating values, and entry information can be sent, via the matrix judging system, to one or more judges for each judging round of each competition. The matrix judging system can receive voting information from each of the judges and can determine which entries can move on to a next round of judging and which entries cannot move on to the next round of judging.

The matrix judging competition can send contestant terminals score data related to entries. A contestant can access a contestant terminal to retrieve score data related to the contestant's entries. For example, the contestant can authenticate with the server using a contestant terminal. The contestant terminal can display the entries associated with the contestant for which score data are available. The score data for each entry can include the competition score received by the entry, the round score received by the entry in each judging round that the entry participated in, and/or one or more criteria scores for each judging round the entry participated in. The competition score can be the score given to an entry from the beginning of the competition until it has been eliminated or until the competition has ended. The competition score can be calculated, for example, using the round scores given to the entry. Round scores can be calculated using the criteria scores given to the entry in a judging round for each of the one or more evaluation criteria. The criteria scores can be based on the rating values associated with rating adjectives selected by judges for each of the evaluation criteria for the entry in the round. A server can make only a subset of the scores available to an contestant terminal. For example, the server can send only the competition score to a contestant terminal. Therefore, the contestant will receive only the competition score for an entry. If additional score data is sent by the server for a contestant's entry, the contestant can view the additional data score as well.

Judging System

FIG. 1 depicts a system for a matrix judging system 100 in accordance with an illustrative implementation. The matrix judging system 100 includes a server 102, a contestant terminal 104, a judging terminal 106, a network 108, a proctor terminal 110, and a presentation terminal 112.

The matrix judging system 100 is an illustrative implementation of a system for creating awards competitions, receiving entries from one or more contestant terminals 104, sending award competition criteria and entry information to one or more judging terminals 106, receiving rating adjective selections from the one or more judging terminals 106, and sending score data for entries to the one or more contestant terminals 104.

The server 102 can include awards competition data. In an implementation, the server 102 can receive a request to create an awards competition. The request can include information related to the awards competition. For example, the request to create an awards competition can include the name of the competition, the categories into which entries can be grouped, the evaluation criteria in which each entry will be judged, the number of rounds of judging in the competition, the selection of judges for each round of the competition, the requirements for moving on from one round to the next, and rating adjectives for each round of competition. In an implementation, the server 102 can impose minimum and maximum requirements for various aspects of the competition. For example, the server 102 can require a minimum number of rounds, a minimum number of evaluation criteria, and a minimum number of rating adjectives. For example, the server 102 can require there be at least two rounds in the competition and at least two rating adjectives in each round. Similarly, the server 102 can impose a maximum limit. For example, the maximum number of rounds can be 7. As discussed in greater detail below, the server 102 can assign a rating value to each rating adjective. The rating values can be used to award points to each entry that participates in a judging round.

In an implementation, the server 102 can store information related to an awards competition with a unique identifier related to the awards competition. For each awards competition that the server 102 creates, the server 102 can receive entries from contestant terminals 104, send voting requests to one or more judging terminals 106, receive votes (e.g., rating adjective selections) from one or more judging terminals 106, and send score data to contestant terminals 104.

Contestant terminals 104 can be used by contestants to submit an entry or information related to an entry into an awards competition. Contestant terminals 104 can also be used by contestants to receive score data for each of the contestant's entry. For example, a contestant can use a contestant terminal 106 to access the server 102 over a network 108 and send information related to an entry to the server. A contestant can receive access to the server 102 using a predetermined URL. For example, the contestant can receive an email containing the URL for submitting an entry. In another example, the contestant can access, using a contestant terminal 104, the server 102 by navigating to a publicly available website. Once a contestant accesses the server 102, the contestant can send information regarding the entry such as, but not limited to, a digital version of the entry, the name of the entry, the name of the artists who created the entry, etc. A digital version of the entry can be considered by each of the judges when voting on the entry in each evaluation criteria. In another example, the entry can be a physical object, or the entry can be temporal in nature, such as a performance. The contestant can submit information related to the physical location of the entry or the time and location where the entry's performance will take place. Thus, the judges can receive instructions on how to view the entry in addition to or in place of a digital copy of the entry.

In another embodiment, a third party can nominate any entry for submission into a competition. The third party can access the server 102 using a predetermined URL. For example, the third party can receive an email containing the URL for submitting an entry. In another example, the third party can access the server 102 by navigating to a publicly available website. The server 102 can receive the third party entries and associate the submitted information regarding the entry with a contestant. For example, if a viewer of an advertisement on television submits the advertisement by accessing the server 102, the server 102 can determine the creative agency responsible for the advertisement and assign the creative agency as the contestant. Thus, the creative agency, which is the contestant, can receive the score data for the entry and not the third party.

A judging terminal 106 can be a computing device that a judge can use to cast one or more votes for an awards competition. In an implementation, the judging terminal 106 can receive awards competition information, including, but not limited to, a competition name, evaluation criteria, rating adjectives, and rating values. The judging terminal can additionally receive digital entries or can receive instructions on where, how, and when to view an entry. If the judging terminal 106 receives a digital entry, the judge can view the entry on the judging terminal 106. For example, if the digital entry is a video, the judge can play the video on the judging terminal 106. A judge can cast a vote using a judging terminal 106. In an implementation, the judging terminal can communicate with the server over a network 108. One skilled in the art will recognize that a judging terminal 106 can communicate with the server 102 over many different communication technologies.

A proctor terminal 110 can be a computing device that an authorized user can use to administer judging rounds for an awards competition. In one implementation, the proctor terminal 110 can access the server 102 via a network 108 and start a round of judging. The proctor terminal 110 can also stop a round of judging. The proctor terminal 110 can add or remove entries from a round of judging, control access to a round of judging, and control access to entries in around of judging. For example, the proctor terminal can disable access to a round of judging for a group of judges that are not permitted to vote in the round. Additionally, the proctor terminal can enable access to entries in a round one at a time. Thus, all judges can be required to vote on a single entry at the same time. Once all of the judges have cast their votes, the proctor 110 can enable access to another entry. In a further implementation, the server 102 can send voting information to the proctor terminal 110. Thus, for example, the proctor terminal 110 can determine which judges have cast a vote and which have not cast a vote for the entry being judged. In a further implementation, the proctor can also receive alerts or information if an entry in a competition will be voted on in more than one competition or category of a competition. In this way, the proctor can be made aware of how often an entry will be voted on.

A presentation terminal 112 can be a computing device that can receive and display a digital version of an entry. In one implementation, the presentation terminal 112 can access the server 102 via a network 108 and access the entry being voted on. The presentation terminal 112 can determine if a digital version of the entry is available and can display the digital version. For example, the presentation terminal 112 can be connected to a large projection screen (not shown). Upon receiving a digital entry, the presentation terminal 112 can display the entry on the projection screen. Thus, a group of judges in a room can view the entry that they must vote on by viewing the projection screen connected to the presentation terminal 112. In another example, the presentation terminal 112 can display information related to the entry. For example, if the entry is a live performance, the presentation terminal 112 can display the name of the performers and the title of the performance on the connected projection screen.

Figure 2A:
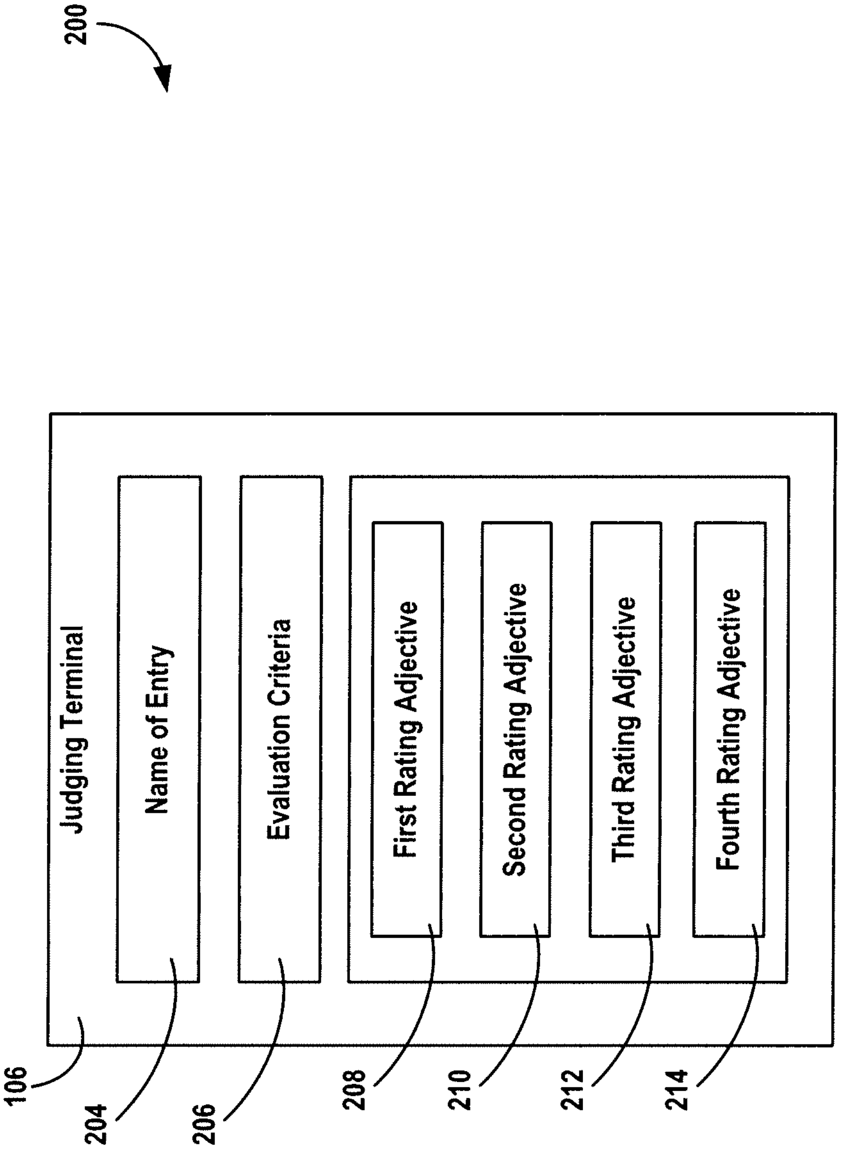
FIGS. 2A and 2B depict representations of a judging terminal user interface for rating an entry on one or more criteria in accordance with an illustrative implementation.
Figure 2B:

FIG. 2A depicts representations of a user interface 200 on a judging terminal 106 for rating an entry on one or more evaluation criteria. FIG. 2B depicts an additional representations of the user interface 200. In one implementation, the user interface can be a web interface accessible via a predetermined URL. For example, a judge can receive an email with a URL and a username and password. The judge can navigate, using the judging terminal, to the URL and enter the username and password to access the user interface. For example, the judging terminal can present the judge with a prompt to enter a username and a password. If a correct username and password combination are entered, the server 102 will allow the judge using the judging terminal to access any entries that the judge has permission to view and vote on. Each judge can be given access to one or more judging rounds for the awards competition by accessing a round configuration user interface of server 102 by an authorized user, for example a server 102 administrator. The web browser at the judging terminal can update its user interface based on which rounds of the competition the judge is allowed to vote in and which round is open for voting. It will be apparent to one skilled in the art that the user interface can be accessible in many ways.

Each judge can be assigned entries to vote on for each round that the judge is given access to. In another example, all entries can be assigned to all judges. The judge can be presented with a list with one or more entry titles. The judge can select one title and be presented with a second list with one or more evaluation criteria. The judge can select one of the evaluation criteria and be presented with a user interface 200. In another example, the judge can be presented with a single entry and associated evaluation criteria based on which entry is being voted on. Thus, a group of judges can be required to vote on the same entry at the same time. Additionally, the opportunity to vote on an entry can be limited to a predetermined time frame, such as, but not limited to, one minute, five minutes, thirty minutes, etc. Thus, a judge can vote while on an entry during the predetermined time frame. Once the predetermined time frame has expired, the judge can no longer vote on the entry. If the judge can vote on a second entry, the second entry can be presented when the second entry's time frame starts. In one implementation, the judging terminal can display a name of the entry 204 being considered, an evaluation criteria 206, and associated rating adjectives 208-214. The number of rating adjectives can be two or more. If rating values are received by the judging terminal 106, they can be hidden from judge. Thus, a judge can be presented with an evaluation criteria of "idea" and associated rating adjectives of "excellent", "good", "average", "poor". The judge can view an entry, consider the quality of the idea behind the entry, and cast a vote by choosing the rating adjective that best matches the judge's impression of the quality of the idea. Thus, for example, the judge can select excellent to convey that the judge believes the idea of the entry is, in fact, excellent. The judge can indicate the finality of his selection by, for example, pushing a button (220, referring to FIG. 2B). The judging terminal 106 can send the rating value associated with the selected rating adjective to the server 102 over network 108. In another implementation, the judging terminal can send the selected rating adjective, instead of the rating value, to the server 102. In a similar manner, the judge can complete voting for each evaluation criteria for each entry in the current round. The user interface 102 can prevent the judge from accessing another entry if the judge has not completed voting for the current entry. For example, if the judge has voted on two out of three evaluation criteria, the judge can be required to vote on the third criteria before submitting the votes and moving on to another entry. Additionally, the judge can abstain from voting on an entry. For example, if the judge is somehow affiliated with the entry (e.g., the judge works for the contestant associated with the entry), the judge can abstain from voting by selecting a button 218, referring to FIG. 2B. In another example, the server 102 can receive a vote for an entry from a judge. The server 102 can determine that the judge is associated with the entry (e.g., the judge works for the contestant) and can replace the received vote with an abstention. Once the judge has finished voting on all evaluation criteria for all assigned entries that the judge can vote on at that time, the user interface can indicate that no more voting is possible. If the judge is allowed to vote in a subsequent round, the user interface can allow the judge access when the subsequent round opens for voting. The number of rating adjectives can change between rounds. For example, for a first round, a judge can be presented with six rating adjectives. The second round can have five rating adjectives, the third round can have four rating adjectives, and so on. A round cannot have less than two rating adjectives. Continuing the example, if there is a seventh round, the seventh round will have at least two rating adjectives, as will any rounds after the sixth round. Thus, in this example, a judge will have either the same or fewer rating adjectives to select from.

Competition Voting

An awards competition can have several rounds of voting. Each entry in a round can be voted on by designated judges. If an entry receives a high enough round score, the entry can proceed to the next round. A round of voting ends when all judges have cast their votes, when a predetermined time expires, or by the consensus of one or more parties. In one implementation, each contestants whose entries will not proceed to the next round can receive score data for the one or more eliminated entries the contestants are associated with by accessing the server 102 using a contestant terminal 104. In another implementation, contestants associated with eliminated entries can access their scores once all rounds of the awards competition have been completed. After the final round, contestants with winning entries can access the score data for their respective winning entry at a contestant terminal 104. In one implementation, each contestant can have one or more entries in the awards competition.

Figure 3:
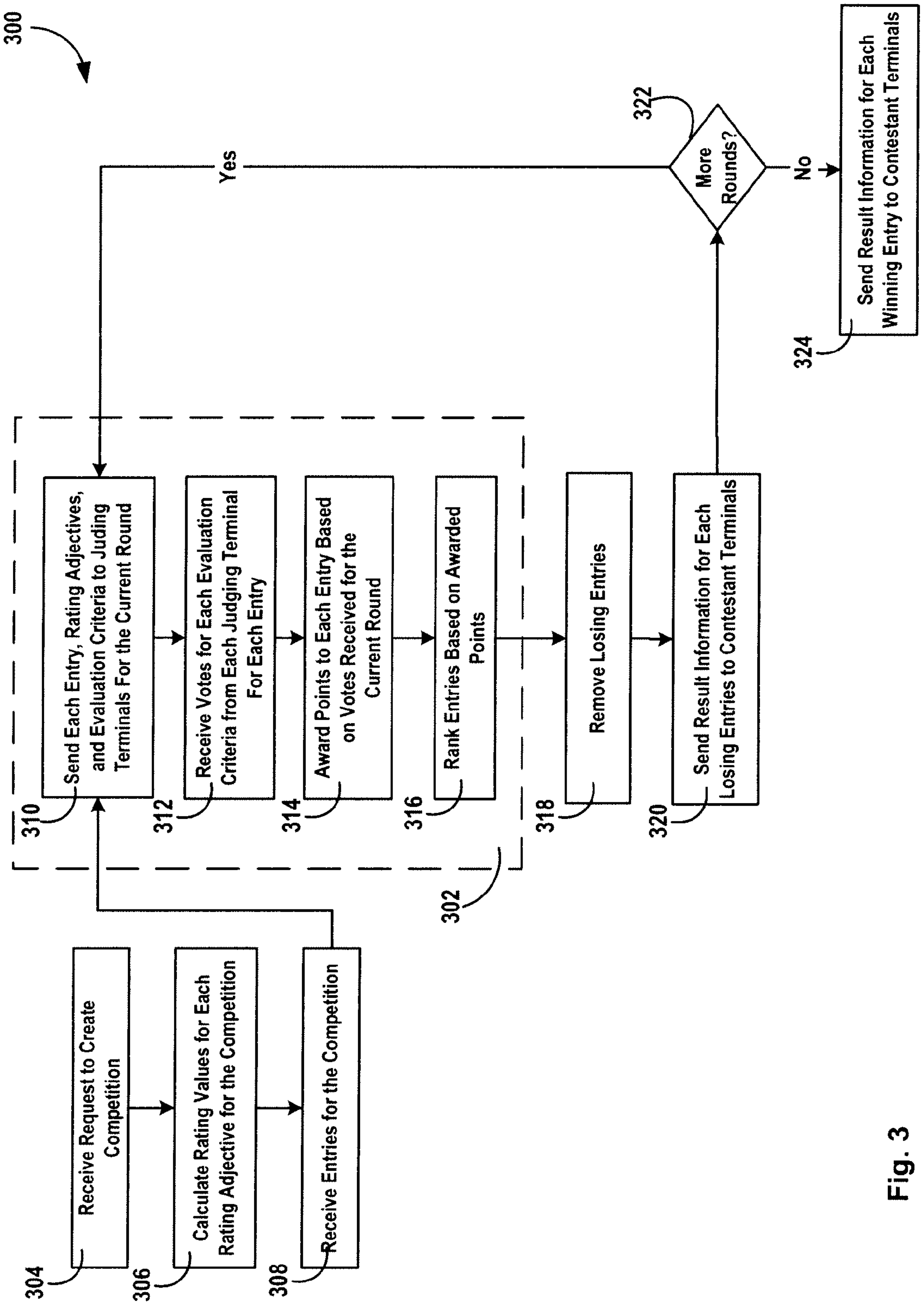
FIG. 3 depicts a flowchart of a method for judging entries in an award competition in accordance with an illustrative implementation.

FIG. 3 depicts a flowchart of a method 300 for judging entries in an awards competition. Additional, fewer, or different operations can be performed, depending on the embodiment. The method 300 can be implemented on a computing device. In one implementation, the method 300 is encoded on a computer readable medium that contains instructions that, when executed by a computing device, cause the computing device to perform operations of the method 300.

In one implementation, described below, the method 300 uses competition information received at a server 102 to configure a judging round, thereby sending entry information to judging terminals 106, receive votes from judging terminals 106, determine which entries proceed to subsequent rounds, and send score information to contestant terminals 104.

In an operation 304, the server 102 can receive a request to create an awards competition. In one implementation, the request to create an awards competition can include information related to the awards competition, including the name of the competition, the categories into which entries can be grouped, the evaluation criteria for which each entry will be judged, the number of rounds of judging in the competition, the selection of judges for each round of the competition, criteria for moving on from one round to the next, and rating adjectives for each round of competition. For example, the request to create an awards competition for advertisements can include a name for the competition. The entry categories can include, for example, "broadcast", "print", and "interactive", The number of rounds for the competition can be set to a number, such as, but not limited to, six or seven. The number of evaluation criteria can be set to a number, such as but, not limited to, two or three. For example, the evaluation criteria can be "idea", "brand relevance", and "execution" for all of the rounds of the competition. The rating adjectives can be "excellent", "good", "average", and "poor", or a series of stars from 1 start to 5 stars, for each of the evaluation criteria. The number of rating adjectives available in each round can also be included. For example, the first round can include all four or five rating adjectives, while later rounds can include only "excellent" and "good" as rating adjectives.

In an operation 306, the server 102 can calculate a rating value for each received rating adjective. In one implementation, the request for the creating an awards competition can include a ranking of the rating adjectives. For example, the server 102 can receive four rating adjectives ordered as "excellent", "good", "average", "poor". Thus, the server 102 can determine that "excellent" is the best rating, because it is listed last, and "poor" is the worst rating, because it is listed first. The server 102 can assign a rating value to each. For example, the server 102 can begin with the worst rating and assign numbers using a Fibonacci sequence. In one implementation the rating values begin on the third number of the Fibonacci. Continuing the above example, "poor" is assigned a value of 1, "average" is assigned a value of 2, "good" is assigned a value of 3, "excellent" is assigned a value of 5. In other implementations, other numbers, such as but not limited to, 0, 1, 3, 5, 8, 13, 21, etc., can be used to determine the rating values of each rating adjective. One skilled in the art will recognize that any sequence of values can be used to indicate the relative ranking of the rating adjectives. For example, the sequence of values can be, but are not limited to, 0, 5, 10, 15, 20, etc.

In an operation 308, the server 102 can receive information relating to one or more entries for the awards competition. The server 102 can receive information for an entry from a contestant or from a third party nominating an entry. For example, a contestant can send entry information using a contestant terminal 104. As discussed above, the entry information can include a digital copy of the entry, a physical location of the entry, the name of the entry, etc. The server 102 can coordinate each round of judging. In one implementation, the server 102 can begin the first round of an awards competition at a predetermined time. For example, the request to create an awards competition can include the starting time of the awards competition.

In another example, an authorized user can instruct the server 102 to start an awards competition. For example, the authorized user can access a web interface and set a configuration, indicating that the server 102 can start the awards competition. In an operation 310, the server 102 can send information for a current round 302 to one or more judging terminals. Each judging terminal will receive information for the current round if a judge accessing the judging terminal can vote in the current round. For example, the server 102 can send information for each entry in the current round, the evaluation criteria, and the rating adjectives for each evaluation criteria. The judging terminal can receive the information and present to the judge a user interface, as described above, with which the judge can cast his vote for each evaluation criteria for each entry. For example, the information sent by the server 102 can include evaluation criteria of "concept or idea", "brand relevance", and "production execution". The server 102 can also send rating adjectives of "poor", "good", "average", "excellent", or other adjectives or symbols, such as, but not limited to, stars for each evaluation adjectives. The server 102 can additionally send the rating value for each of the rating adjectives. Thus, each entry can be voted on by the judge for its concept/idea, brand relevance, and production execution. Accordingly, each judge can vote for each evaluation criteria by selecting one of the rating adjectives. Similarly, the judge can cast a vote for each additional entry participating in the current round. Each additional judge who is voting in the current round can also access a judging terminal and cast votes for each of the entries in the current round. In a further implementation, a judge can be alerted if the entry will be voted on in more than one competition or category of a competition. For example, if a print ad is going to be voted on in the categories of "print design" and "outdoor print", the judge can receive an alert when voting on the entry in the "print design" category that the entry will also be voted on for the "outdoor print" category. Thus, the entry can be voted on for its own merit per competition or category of competition.

In an operation 312, the server 102 can receive, from judging terminals, the votes cast by each judge for the current round. In an implementation, each received vote can include information indicating the entry voted on, the evaluation criteria voted on, and an indication of the judge's vote for the evaluation criteria. For example, the server 102 can receive the rating value for the selected rating adjective. In another example, the server 102 can receive the selected rating adjective rather than the rating value. The judging terminal can send and the server 102 can receive the judge's votes for the round.

In an operation 314, the server 102 can calculate the criteria scores for each entry for the current round. In an implementation, the server 102 can receive from a judging terminal the rating adjectives assigned to an entry for each evaluation criteria by a judge. The server 102 can determine the rating value assigned in operation 306 to the rating adjective received from the judging terminal. In another implementation, the server 102 can receive the rating value rather than the rating adjective. The server 102 can calculate the criteria score for the evaluation criteria based on the rating values of the selected rating adjectives received from one or more judging terminals. For example, if a first judge casts a vote of poor for the evaluation criteria of idea for an entry and if a second judge awards the same entry in the same evaluation criteria a rating adjective of excellent, the server 102 can calculate a criteria score for the evaluation criteria of idea. For example, the server can simply add the rating values awarded by each judge together. Thus, in the above example, the criteria score for the evaluation criteria of idea for the entry would be 5+1=6. In another example, the rating values can be averaged. Referring again to the above example, the criteria score for the evaluation criteria of idea would be $$\frac{(5+1)}{2} = 3.$$

The server 102 can calculate the criteria score for each evaluation criteria based on the votes received from the judges participating in a round.

In a further implementation, the server 102 can calculate the round score for each entry for the current round by combining the criteria score for each evaluation criteria. For example, if the criteria scores awarded to an entry were 3, 5, and 15 for the evaluation criteria of idea, brand relevance, and execution, respectively, the round score could be calculated by summing each individual criteria scores. In another example, the server 102 can calculate a weighted average of the criteria scores as the round score. For example, the server 102 can weight the evaluation criteria of idea as 45% of the round score, the evaluation criteria brand relevance as 30% of the round score, and the evaluation criteria of execution as 25% of the round score. Thus, the round score can be $$\frac{(3\times 0.45)+(5\times 0.30)+(15\times 0.25)}{3} = 2.2.$$

In an operation 316 the server 102 can rank the entries voted on in the current round based on the round scores. In one implementation, each entry can be ranked based on the round score received in the current round. If the competition has multiple categories, entries can be ranked within a single category or they can be ranked across all categories. The current round of voting can end when all votes have been received or if a predetermined time has expired.

In an operation 318, the server 102 can remove the entries that will not proceed to the next round. In one implementation, the server 102 can determine which entries will not proceed to the next round using the ranking information from operation 316. For example, the server 102 can remove a predetermined number of entries with the lowest round scores in the current round. In another example, if only the top ten entries can proceed from the current round, the server 102 can select the ten entries awarded the highest round scores in the current round. In another implementation, the server 102 can determine if any of the removed entries qualify for an award. For example, the awards competition can include awards, such as “shortlist certificate”, “bronze trophy”, “silver trophy”, “gold trophy”, “grand trophy”, and “special industry awards”. Thus, for example, a trophy can be awarded to an entry that achieved a minimum number of points or a minimum rank among all entries. In another example, an award can be based on the score received in a single evaluation criteria.

In an operation 320, the server 102 can send to the contestants associated with each losing entry the score data for each of their losing entries. Contestants can access the score data using a contestant terminal 104. In one implementation, the server 102 can send to a contestant terminal 104 the criteria scores for each evaluation criteria and the round scores for each round of the awards competition that the entry participated in. Thus, for example, the contestant terminal can receive a tabulated result with the criteria scores and the round scores listed for each round. Additionally, the results can also include a competition score that combines the round scores from all of the rounds. For example, the round scores for each round that the entry participated in can be summed, averaged, or weighted then averaged. In one implementation, earlier rounds can be given a lower weight than later rounds.

In another embodiment, the server 102 can send an aggregated criteria score for each evaluation criteria and a competition score for an entry to a contestant associated with the entry. In an implementation, the server 102 can combine the criteria scores for each evaluation criteria from all of the rounds of judging and send the aggregated criteria scores for the entry to the contestant. For example, the server can add the criteria scores received in each round for an evaluation criteria to determine the aggregated criteria score for the entry over all the rounds that the entry participated in. In other examples, the criteria scores from the multiple rounds can be averaged or weighted then averaged. The server 102 can calculate the aggregated criteria score for each of the one or more evaluation criteria for the entry in the same manner. In a further implementation, the server 102 can also send the contestant information relating to any awards given to the losing entry. For example, the losing entry with highest competition score can be awarded an honorable mention prize. Thus, the contestant associated with the losing entry with the highest competition score will be informed, via a contestant terminal, of the honorable mention prize. The results can be sent by the server 102 via the network 108. For example, the server 102 can send a notification to a contestant terminal 104 associated with the contestant.

In an operation 322, the server 102 can determine if there are any more rounds in the competition. In one implementation, the awards competition information received in operation 304 can contain the number of rounds in the competition. For example, the awards competition information can indicate that the competition consists of two rounds. In another implementation, the number of rounds can be determined by the number of entries. For example, if an awards competition receives twenty entries, and only one entry is to be eliminated in each round, then the server 102 can calculate the total number of rounds as nineteen. In another implementation, the number of rounds can continue until one entry wins. For example, if an entry must reach a certain competition score, the targeted competition score being greater than the maximum amount that can be awarded in any single round, the competition can continue until one entry reaches the competition score required to win. If the server 102 determines that another round remains, the server 102 can set the current round and send information related to the round to the judges, as described in operation 310. If the server 102 determines that there are no more rounds in the competition, the server 102 can proceed to an operation 324.

In an operation 324, the server can send the score data for the winning entry to the contestant associated with the winning entry. The server 102 can send scores calculated in the same manner as in operation 320. If there are multiple winners, then each contestant can receive the score data for their winning entries at a contestant terminal. Additionally, if winners are given awards, the type of award can be determined based on, for example, the competition score or the score received for one or more of the evaluation criteria. In the event that a tie occurs, each tied entry can be given the same award.

Figure 4:
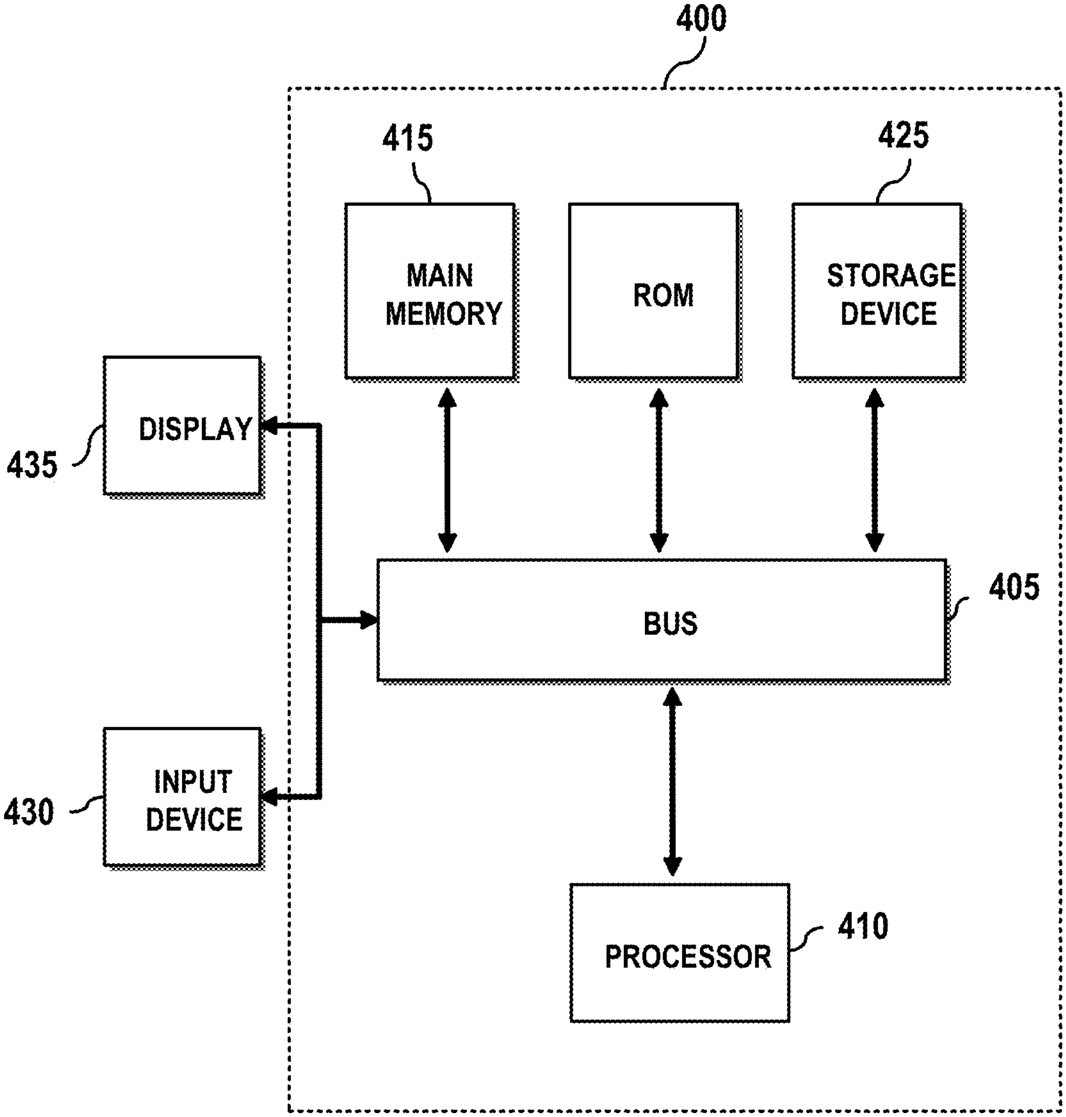
FIG. 4 is a block diagram of a computer system in accordance with an illustrative implementation.

FIG. 4 is a block diagram of a computer system in accordance with an illustrative implementation. The computer system or computing device 400 can be used to implement the server 102, judging terminal 106 and/or the contestant terminal 104. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read-only memory (ROM) 410 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving competition information for a competition, wherein the competition information comprises a plurality of evaluation criteria, two or more rating adjectives, and information for one or more rounds of the competition, wherein only one round of the one or more rounds can be open for judging at a time;

calculating, using a processor, a rating value for each of the two or more rating adjectives;

receiving one or more entries, wherein the one or more entries are submitted into the competition associated with the competition information, and wherein each of the one or more entries are associated with one of a plurality of contestants;

conducting at least one round of judging, each round of judging comprising:

sending, to one or more judging terminals, a round information, wherein the round information comprises the plurality of evaluation criteria, each entry in the round, and at least two of the two or more rating adjectives;

receiving, from each of the one or more judging terminals, voting information, wherein the voting information comprises a rating adjective selection for each of the plurality of evaluation criteria for each of the entries in the round;

calculating an individual weighted criteria score for each individual evaluation criteria of the plurality of evaluation criteria for each entry, wherein the weighted criteria score is based on the rating value associated with the rating adjective selections received from the one or more judging terminals;

calculating a round score for each entry, wherein the round score is calculated based on the weighted criteria score for each of the plurality of evaluation criteria, and wherein the round score is associated with the round;

ranking entries in the round, wherein the rank is determined based on the round score for each of the one or more entries in the round;

removing non-qualifying entries, wherein the non-qualifying entries are based on the round score of one or more entries in the round;

determining that the round is the last round of judging; and if the round is the last round of judging, identifying one or more remaining entries based at least on the determining that the round is the last round of judging.

2. The method of claim 1, further comprising:

if it is determined that the round is not the last round of judging, conducting an additional round of judging.

3. The method of claim 1, wherein the rating value is based on the Fibonacci sequence.

4. The method of claim 3, wherein the rating value for a first rating adjective is set to one, and wherein the first rating value corresponds to the third number in the Fibonacci sequence.

5. The method of claim 1, further comprising determining first score data for each of the non-qualifying entries, wherein the first score data comprises the weighted criteria score for each of the plurality of evaluation criteria.

6. The method of claim 5, further comprising:

sending the first score data for each of the non-qualifying entries to a respective contestant;

determining whether the round is a last round; and if it is determined that the round is the last round of judging, sending, for each of one or more remaining entries, second score data to each respective contestant.

7. The method of claim 1, further comprising determining first score data for each of the non-qualifying entries, wherein the first score data comprises the round score.

8. The method of claim 1, further comprising determining first score data for each of the non-qualifying entries, wherein the first score data comprises a competition score.

9. The method of claim 1, wherein a first judging terminal receives the round information for a first round, and wherein the first judging terminal does not receive the round information for a second round.

10. A system comprising:

one or more processors configured to:

receive competition information for a competition, wherein the competition information comprises a plurality of evaluation criteria and two or more rating adjectives, and information for one or more rounds of the competition, wherein only one round of the one or more rounds can be open for judging at a time;

calculate a rating value for each of the two or more rating adjectives;

receive one or more entries, wherein the one or more entries are submitted into the competition associated with the competition information, and wherein each of the one or more entries are associated with one of a plurality of contestants;

conduct at least one round of judging, each round for judging comprising:

send, to one or more judging terminals, a round information, wherein the round information comprises the plurality of evaluation criteria, each entry in the round, and at least two of the two or more rating adjectives;

receive, from each of the one or more judging terminals, voting information, wherein the voting information comprises a rating adjective selection for each of the plurality of evaluation criteria for each of the entries in the round;

calculate an individual weighted criteria score for each individual evaluation criteria of the plurality of evaluation criteria for each entry, wherein the weighted criteria score is based on the rating value associated with the rating adjective selections received from the one or more judging terminals;

receive a round score for each entry, wherein the round score is calculated based on the weighted criteria score for each of the plurality of evaluation criteria, and wherein the round score is associated with the round;

rank entries in the round, wherein the rank is determined based on the round score for each of the one or more entries in the round; and remove non-qualifying entries, wherein the non-qualifying entries are based on the round score of one or more entries in the round;

determine that the round is the last round of judging; and if the round is the last round of judging, identify one or more remaining entries based at least on the determining that the round is the last round of judging.

11. The system of claim 10, wherein the one or more processors are further configured to:

if it is determined that the round is not the last round of judging, conduct an additional round of judging.

12. The system of claim 10, wherein the rating value is based on the Fibonacci sequence.

13. The system of claim 12, wherein the rating value for a first rating adjective is set to one, and wherein the first rating value corresponds to the third number in the Fibonacci sequence.

14. The system of claim 10, wherein the one or more processors are further configured to determine first score data for each of the non-qualifying entries, wherein the first score data comprises the weighted criteria score for each of the plurality of evaluation criteria.

15. The system of claim 10, wherein the one or more processors are further configured to determine first score data for each of the non-qualifying entries, wherein the first score data comprises the round score.

16. The system of claim 10, wherein the one or more processors are further configured to determine first score data for each of the non-qualifying entries, wherein the first score data comprises the competition score.

17. The system of claim 10, wherein a first judging terminal receives the round information for a first round, and wherein the first judging terminal does not receive the round information for a second round.

18. A non-transitory computer-readable medium having instructions stored thereon, wherein the instructions comprise:

instructions to receive competition information for a competition, wherein the competition information comprises a plurality of evaluation criteria and two or more rating adjectives, and information for one or more rounds of the competition, wherein only one round of the one or more rounds can be open for judging at a time;

instructions to calculate a rating value for each of the two or more rating adjectives;

instructions to receive one or more entries, wherein the one or more entries are submitted into the competition associated with the competition information, and wherein each of the one or more entries are associated with one of a plurality of contestants;

instructions to conduct at least one round of judging, each round for judging comprising:

instructions to send, to one or more judging terminals, a round information, wherein the round information comprises the plurality of evaluation criteria, each entry in the round, and at least two of the two or more rating adjectives;

instructions to receive, from each of the one or more judging terminals, voting information, wherein the voting information comprises a rating adjective selection for each of the plurality of evaluation criteria for each of the entries in the round;

instructions to calculate an individual weighted criteria score for each individual evaluation criteria of the plurality of evaluation criteria for each entry, wherein the weighted criteria score is based on the rating value associated with the rating adjective selections received from the one or more judging terminals;

instructions to receive a round score for each entry, wherein the round score is calculated based on the weighted criteria score for each of the plurality of evaluation criteria, and wherein the round score is associated with the round;

instructions to rank entries in the round, wherein the rank is determined based on the round score for each of the one or more entries in the round; and instructions to remove non-qualifying entries, wherein non-qualifying entries are based on the round score of one or more entries in the round;

instructions to determine that the round is the last round of judging; and instructions to, if the round is the last round of judging, identify one or more remaining entries based at least on the determining that the round is the last round of judging.

19. The non-transitory computer-readable medium of claim 18, wherein the instructions further comprise:

instructions to conduct, if it is determined that the round is not the last round of judging, an additional round of judging.

20. The non-transitory computer-readable medium of claim 18, wherein the rating value is based on the Fibonacci sequence.

* * * * *

UNITED STATES PATENT AND TRADEMARK OFFICE

CERTIFICATE OF CORRECTION

PATENT NO. : 8,663,017 B1
APPLICATION NO. : 13/836384
DATED : March 4, 2014
INVENTOR(S) : James M. Smyth It is certified that error appears in the above-identified patent and that said Letters Patent is hereby corrected as shown below:

In the specification

Column 11, line 17, "(ROM) 410" should be -- (ROM) --

Signed and Sealed this
Twelfth Day of April, 2016

Michelle K. Lee
*Director of the United States Patent and Trademark Office*